(12) United States Patent
Hagy et al.

(10) Patent No.: US 8,595,064 B1
(45) Date of Patent: Nov. 26, 2013

(54) HOST SYSTEM AND METHOD FOR FACILITATING VIEWER ENGAGEMENT OF DIGITAL CONTENT FROM THE HOST AND/OR THIRD-PARTY PROVIDERS

(75) Inventors: Mary L. Hagy, Philadelphia, PA (US); Jodie Lynn Morgan, Wilmington, DE (US); Karen G. Narwold, Wilmington, DE (US)

(73) Assignee: cWyze, Inc., Wilmington, DE (US)

( * ) Notice: Subject to any disclaimer, the term of this patent is extended or adjusted under 35 U.S.C. 154(b) by 71 days.

(21) Appl. No.: 13/150,908

(22) Filed: Jun. 1, 2011

Related U.S. Application Data

(60) Provisional application No. 61/350,054, filed on Jun. 1, 2010.

(51) Int. Cl.
*G06Q 30/00* (2012.01)

(52) U.S. Cl.
USPC ............... 705/14.39; 705/14.1; 705/14.11; 705/14.16; 725/23

(58) Field of Classification Search
USPC ....................................... 705/14.39
See application file for complete search history.

(56) References Cited

U.S. PATENT DOCUMENTS

| | | | |
|---|---|---|---|
| 6,529,878 B2 | 3/2003 | De Rafael et al. | |
| 2002/0055876 A1 | 5/2002 | Gabler | |
| 2006/0277106 A1 | 12/2006 | Wright | |
| 2007/0265910 A1 | 11/2007 | Varghese | |
| 2008/0140491 A1 | 6/2008 | Jain et al. | |
| 2008/0154725 A1 | 6/2008 | Flake et al. | |
| 2008/0162206 A1 | 7/2008 | Mak et al. | |
| 2008/0195460 A1 | 8/2008 | Varghese | |
| 2008/0313040 A1 | 12/2008 | Rose et al. | |
| 2009/0012867 A1 | 1/2009 | Lerman et al. | |
| 2009/0053992 A1* | 2/2009 | Butler | 455/3.06 |
| 2010/0010866 A1 | 1/2010 | Bal et al. | |
| 2010/0058376 A1 | 3/2010 | Alhadeff et al. | |

* cited by examiner

*Primary Examiner* — James A Reagan
(74) *Attorney, Agent, or Firm* — Waddey Patterson; James R. Cartiglia; Gary L. Montle

(57) ABSTRACT

A host system and methods are provided for engaging consumers to interact with at least a sub-set of digital content provided by a third-party client. The client also provides associated user engagement criteria and reward criteria. A user community platform may be defined for engagement, and a user interface and delivery network are established accordingly. The host system engages a user to interact with the user interface, either by proactively inviting user interaction or by receiving a request for interaction with the user interface. The host displays digital content to the user which is selected based on user criteria and the user engagement criteria. Completion of user engagement is confirmed based on the reward criteria, after which access is provided to a predetermined reward. User engagement data is collected by the host in accordance with the engagement criteria and the client is provided access to the user engagement data.

9 Claims, 11 Drawing Sheets

HOST SYSTEM AND METHOD FOR FACILITATING VIEWER ENGAGEMENT OF DIGITAL CONTENT FROM THE HOST AND/OR THIRD-PARTY PROVIDERS

CROSS-REFERENCES TO RELATED APPLICATIONS

This application claims benefit of the following patent application which is hereby incorporated by reference U.S. Provisional Patent Application No. 61/350,054, filed Jun. 1, 2010.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to computer-implemented systems and methods for engaging users to interact with digital content provided by the host and/or a third party content provider.

More particularly, the present invention relates to a host system and method that facilitates user engagement and interaction via incentives such as rewards, credits or recognition provided by a third party (or the host itself) in return for receiving and responding to associated digital content.

The demand for video content in online and mobile marketing, ecommerce, training and education, is expected to grow exponentially in the coming years. However, even with technological advances, content owners are still challenged by determining the degree to which viewers actually engage with the content. Because viewer consumption of video content has been proven to increase the viewer's interest by a factor of seven, content generators seek new ways to engage viewers, especially ways that subsequently generate data that drives business decisions. While some videos are promoted as "interactive," the engagement is primarily a request for information or the ability to apply a discount or print a coupon.

BRIEF SUMMARY OF THE INVENTION

Computer-implemented host systems and methods in accordance with the present disclosure are provided that may generally track, aggregate, audit, distribute and manage cost-effective, high-volume and low-volume transactions that reward authorized persons with financial, educational and/or other incentives, in return for engaging with a third party's digital content.

Briefly stated, an exemplary method as disclosed herein may provide the ability to monetize existing or new video content with a Flash- or other equivalent operating system-enabled interactive which turns the video screen into a web of two-way hot spots, presenting engagement features before, during and/or after the video is played. While users interact, their actions are transparently tracked and data is captured.

A host system of the present disclosure may include a proprietary software application that enables viewers to engage, earn and spend, obtain products or rewards, or complete education requirements, via an interactive video interface that creates a two-way, lean-in experience with digital content that may be provided by a third party or by the host. The viewer is rewarded, and the content provider receives easily-configurable, customizable creative feedback with substantially real-time data reporting. Some video ads are labeled "interactive," but to the consumer, the experience is an invitation to click for more information, download a coupon or to simply view the content. It's a one-way transmission, which is transformed by the host from a monologue into dialogue.

Four exemplary core tools can be applied inside the video and after the video is completed: Multiple Choice questions, a Ranking Meter (with various subset tools available), a "Click and Get" purchase or product order that can be presented during or after the video is played, and Information Spotlight (e.g., pop-ups). Content providers can easily configure high-impact interactives to create video engagements quickly and cost effectively, with on-the-fly updates based on real-time data.

Viewer engagement can occur on the content provider's website, rather than linking to a new landing page, which can frustrate viewers and lower interaction rates, or other delivery methods, such as for example ad networks and exchanges, local area networks and digital video discs.

Content generators can tailor the offering to allow viewers to choose which reward they value most, including cash, coupons, discounts, virtual currency, charitable donation, point-of-purchase option, product, credit toward educational goals, or other incentives.

Data is collected transparently, with selection options for privacy protection for the viewer and the content owner. Viewer engagements are validated, and rewards are delivered, while providing content owners valuable data and analytics packages in substantially real time.

In a first embodiment, methods of the present disclosure may be implemented within the context of a consumer reward engagement marketing system. A content provider establishes one or more interactive projects (e.g., ad campaigns, product promotions, sweepstakes) which are associated with financial (or other equivalent incentive) rewards to be exchanged for engagement of video content by users. The users may be part of a predetermined group of users that are defined by the content provider, such as for example members of a common social network, gaming community, or shopping site.

In a second embodiment, methods of the present disclosure may be implemented within the context of a consumer reward e-commerce system.

In an aspect of systems particularly in accordance with the first and second embodiments, a secure account may be provided where the content provider's (e.g., advertiser's, promoter's) funds are maintained and tracked for deposits and debits.

In a third embodiment, methods of the present disclosure may be implemented within the context of a consumer reward for education, corporate training, or other equivalent remote learning system. A content provider here may establish one or more interactive curriculums (e.g., lessons, instructional videos, etc.) which are associated with for example certificates of completion to be exchanged for confirmed completion of engagement by users. The users may be part of a predetermined group of users that are defined by the content provider, such as for example a common business entity.

In a fourth embodiment, methods of the present disclosure may be implemented within the context of a consumer reward health care system. Similarly to the educational aspect, a content provider here may establish one or more interactive curriculums (e.g., lessons, instructional videos, etc.) which are associated with for example certificates of completion to be exchanged for confirmed completion of engagement by users. The users may be part of a predetermined group of users that are defined by the content provider, such as for example health care providers and patients associated with a particular healthcare network, hospital, etc.

In an aspect according to various embodiments of systems and methods as described herein, a content server is provided that can be powered by the system to present engagement-based digital content, and behind which the host system can operate to track and report data related to a user's engagement on behalf of the content provider.

In another aspect, a group of users (e.g., a client-defined user community or CDUC) may be defined which could for example be any association, business entity, social media, person-centric, financial institution or other entity, and where user information is currently stored, can be retrieved into a database and supplemented with additional collected data.

In another aspect, a system database may be provided for securing campaign-focused data, integrating with the CDUC database or serving separately as a tracking system for movement of reward units.

In yet another aspect, integration may be performed of the system database with advertiser's database for access and reporting of data collected during a user engagement.

In yet another aspect, a database may be provided for collecting, cleansing, validating and integrating project or campaign-based data for broader exemplary uses.

In still other aspects, features may be provided for loss prevention and information security, as well as cloud-based integrations for web and mobile applications.

An exemplary method for facilitating and incentivizing consumer engagement is implemented by a host computer system accessible by a third-party content provider (client) and one or more users via a communications network. The method includes the steps of acquiring access to a set of digital content, user engagement criteria and reward criteria as provided by the content provider; engaging a user to interact with the host system based on user criteria; establishing a user interface effective to deliver the digital content in accordance with the engagement criteria; delivering selected digital content to the user via the user interface, the content selected from the set of digital content based on the user criteria and the user engagement criteria; confirming completion of the user engagement in accordance with the reward criteria; providing access by the user to a predetermined reward based upon confirmed completion of the engagement; collecting user engagement data in accordance with the engagement criteria; and providing the content provider with access to the data.

Further within the scope of the present disclosure, an exemplary host system for consumer reward engagement on behalf of a third-party content provider includes a server functionally linked to a communications network, a processor, a database, and a computer-readable memory medium having instructions residing thereon. The instructions are executable by the processor to receive and store a set of digital content and associated user engagement criteria and reward criteria provided by a content provider via the communications network; establish a user interface effective to deliver the digital content in accordance with the engagement criteria; engage a user to interact with the user interface based on user criteria; deliver selected digital content to the user via the user interface, the content selected from the set of digital content based on the user criteria and the user engagement criteria; confirm completion of the user engagement in accordance with the reward criteria; provide access by the user to a predetermined reward based upon confirmed completion of the engagement; collect user engagement data in accordance with the engagement criteria and store the data in the database; and provide access to the user engagement data by the content provider, whether by direct transmission or by storage of the data in a database accessible to the provider via for example a user interface.

Further within the scope of the present disclosure, a computer-readable memory medium includes instructions residing thereon, which are executable by an associated processor to implement a method of consumer reward engagement on behalf of a content provider. The method includes the steps of functionally linking a server upon which the memory medium resides to a database upon which is stored a set of digital content and associated user engagement criteria and reward criteria provided by a content provider; establishing a user interface accessible by a user via a remote computing device and effective to deliver the digital content in accordance with the engagement criteria; engaging the user to interact with the user interface based on user criteria; delivering selected digital content to the user via the user interface, the content selected from the set of digital content based on the user criteria and the user engagement criteria; confirming completion of the user engagement in accordance with the reward criteria; providing access by the user to a predetermined reward based upon confirmed completion of the engagement; and collecting user engagement data in accordance with the engagement criteria and store the data in the database.

DETAILED DESCRIPTION OF THE INVENTION

Figure 1:
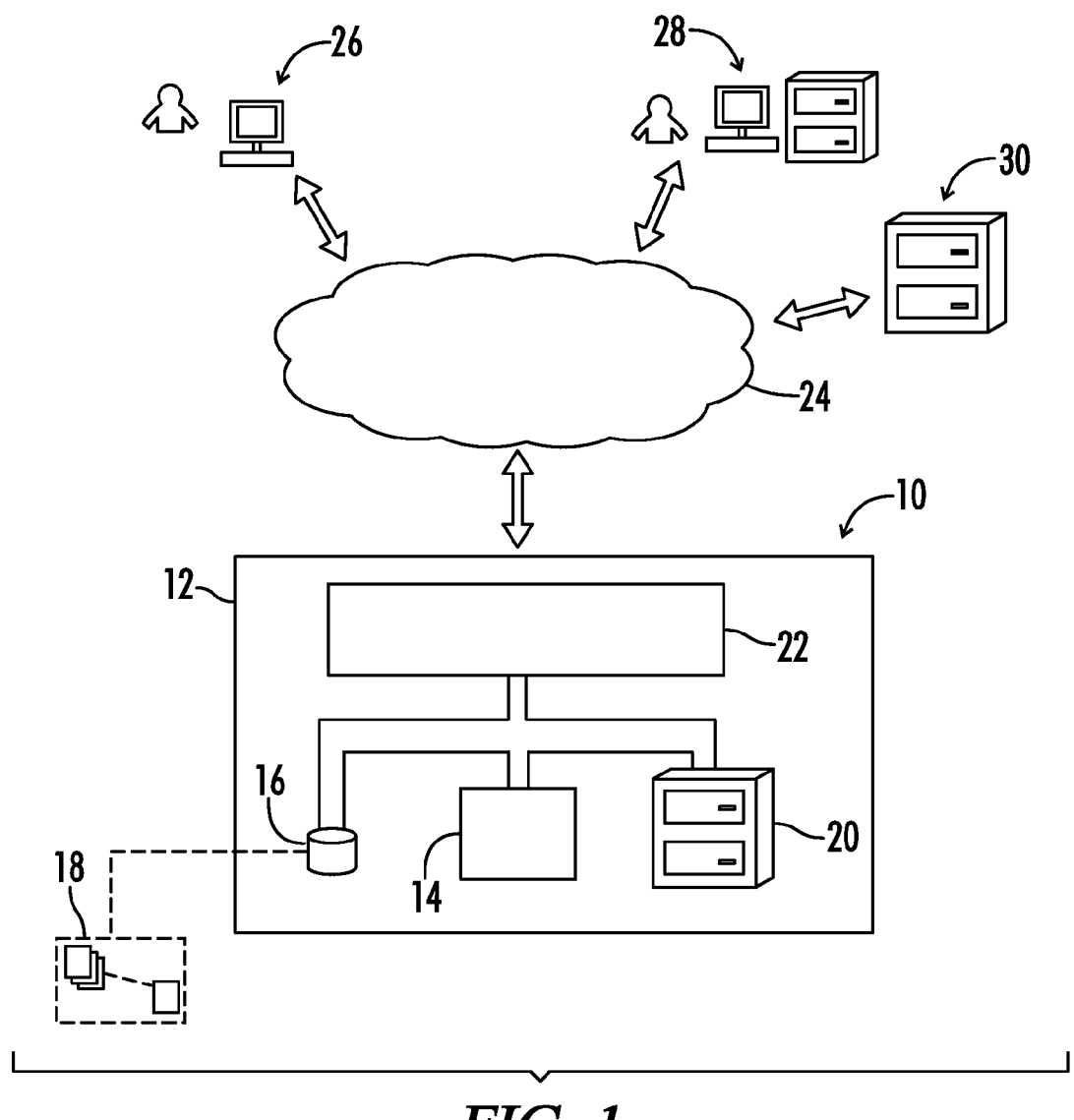
FIG. 1 is a block diagram representing an embodiment of a host system for engaging viewers of digital content on behalf of a third-party content provider as further described herein.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated, and whether web- or mobile-based in nature.

Referring generally to FIGS. 1-4, various embodiments of a computer-based host system and associated methods are described herein for consumer reward engagement on behalf of third-party content providers. The consumer engagement may take place in various embodiments via a user interface associated with a user community platform as defined by the content provider, a web-accessible site operated by the host system, a user interface generated by the host on a remote computing device via a mobile communications network, or by various alternative platforms and methods as may be understood by persons of skill in the art. Where the various figures may describe embodiments sharing various common elements and features with other embodiments, similar elements and features are given the same reference numerals and redundant description thereof may be omitted below.

The terms "user" and "consumer" as used interchangeably herein may refer to at least viewers, listeners, visitors, guests, members or any other person constituting a target audience for whom digital content is intended and from whom engagement data is to be collected on behalf of the content provider, any may include generally actual users or potential users of the system based on inclusion or membership for example in a group so defined by the content provider.

Various embodiments of systems and methods as disclosed herein may substantially overlap in scope with respect to each of the aspects previously described above, but the associated features or steps may vary in detail according to the particular implementation and additional features or steps may be desirable to better accomplish or facilitate the associated functions.

Referring first to FIG. 1, an embodiment of a host system 10 may include a host server 12 upon which resides a processor 14, a memory medium 16, and one or more databases 20. The term "host" as used herein may refer to owners and/or operators of a system as authorized or otherwise effective to implement the methods described herein. The server 12 may be coupled or otherwise functionally linked to a communications network 24, such as through the use of for example a user interface 22 further generated by the system 10 and residing on or functionally linked to the server 12. In other embodiments (not shown) the system 10 may be embodied using a plurality of servers across which various system components are distributed but functionally linked via the communications network.

The term "computer-readable memory medium" as used herein may refer to any non-transitory medium alone or as one of a plurality of non-transitory memory media having processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

Generally stated, the host system 10 may be accessible by and communicatively coupled to a digital content provider 28 (or more particularly a computing device or server associated therewith), one or more users 26 (i.e., consumers) of digital content provided by the content provider and accessible via a user interface, and optionally a separate database associated with a project initiated by the content provider and residing on a remote server in which for example rewards or the like may be securely stored account and inaccessible to the content provider once established.

Figure 2:
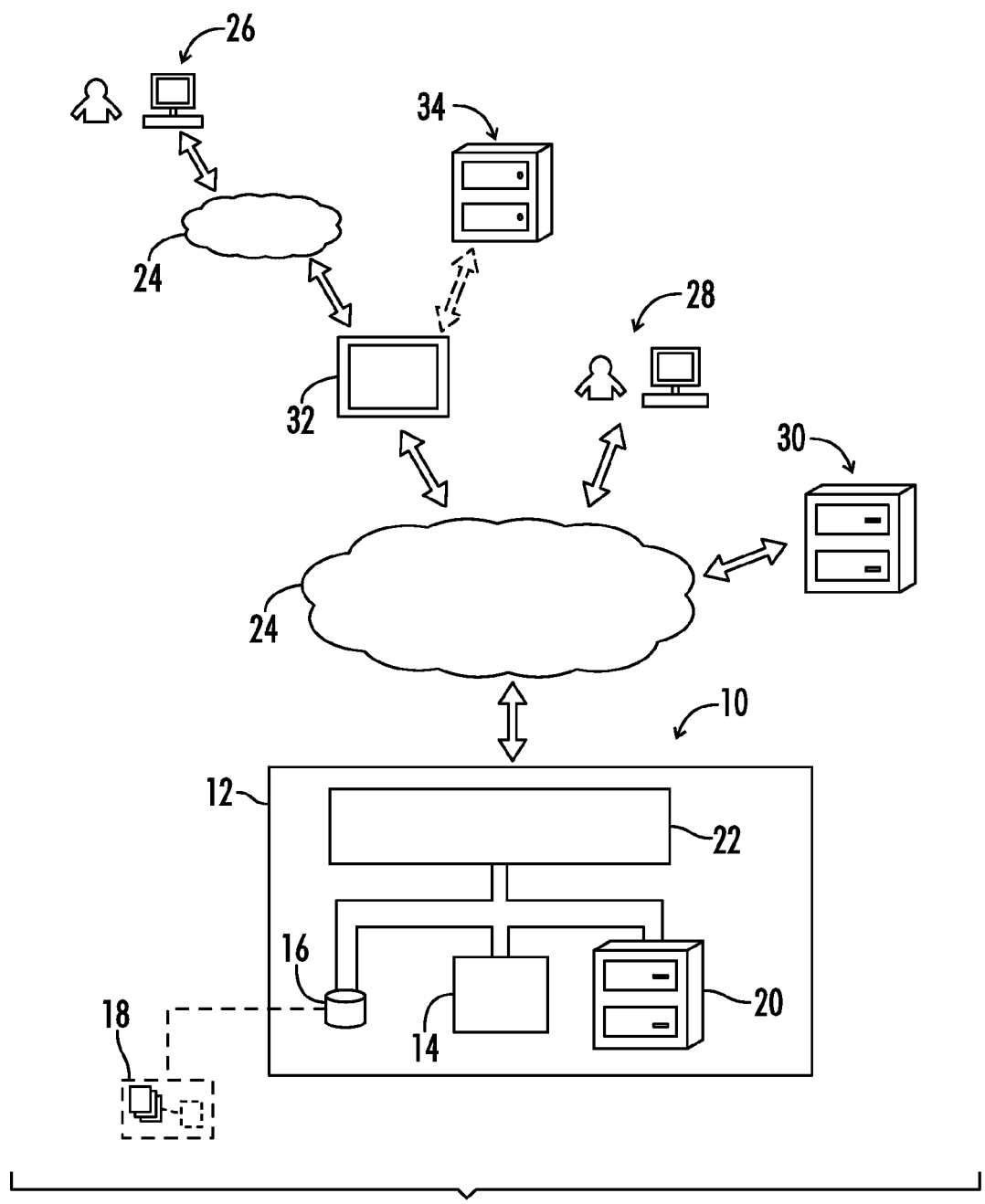
FIG. 2 is a block diagram representing another embodiment of a host system for engaging viewers of digital content on behalf of a third-party content provider as further described herein.

Referring to FIG. 2, in various embodiments the host system 10 may be linked via the communications network 24 to a site or platform associated with a user group as defined or otherwise selected by the content provider for engagement (The user group may further be referred to generally herein as a "client-defined user community" or "CDUC"). The CDUC as represented may in accordance with various embodiments as further described below include at least a user database 34 and a user interface 32 or equivalent platform by which the database may be accessible from the host system and further upon which users may be engaged to view or otherwise interact with digital content from the content provider. In various embodiments, the CDUC may be associated with or even the same entity as the content provider, in which case the user interface platform may be for example a home page or equivalent site operated by the content provider. Alternatively, the host system may link to a site or platform associated with a CDUC for the purpose of obtaining user information or otherwise facilitating user interaction, while still delivering digital content via a site or equivalent interface operated by or associated with the content provider or the host system itself.

Figure 3:
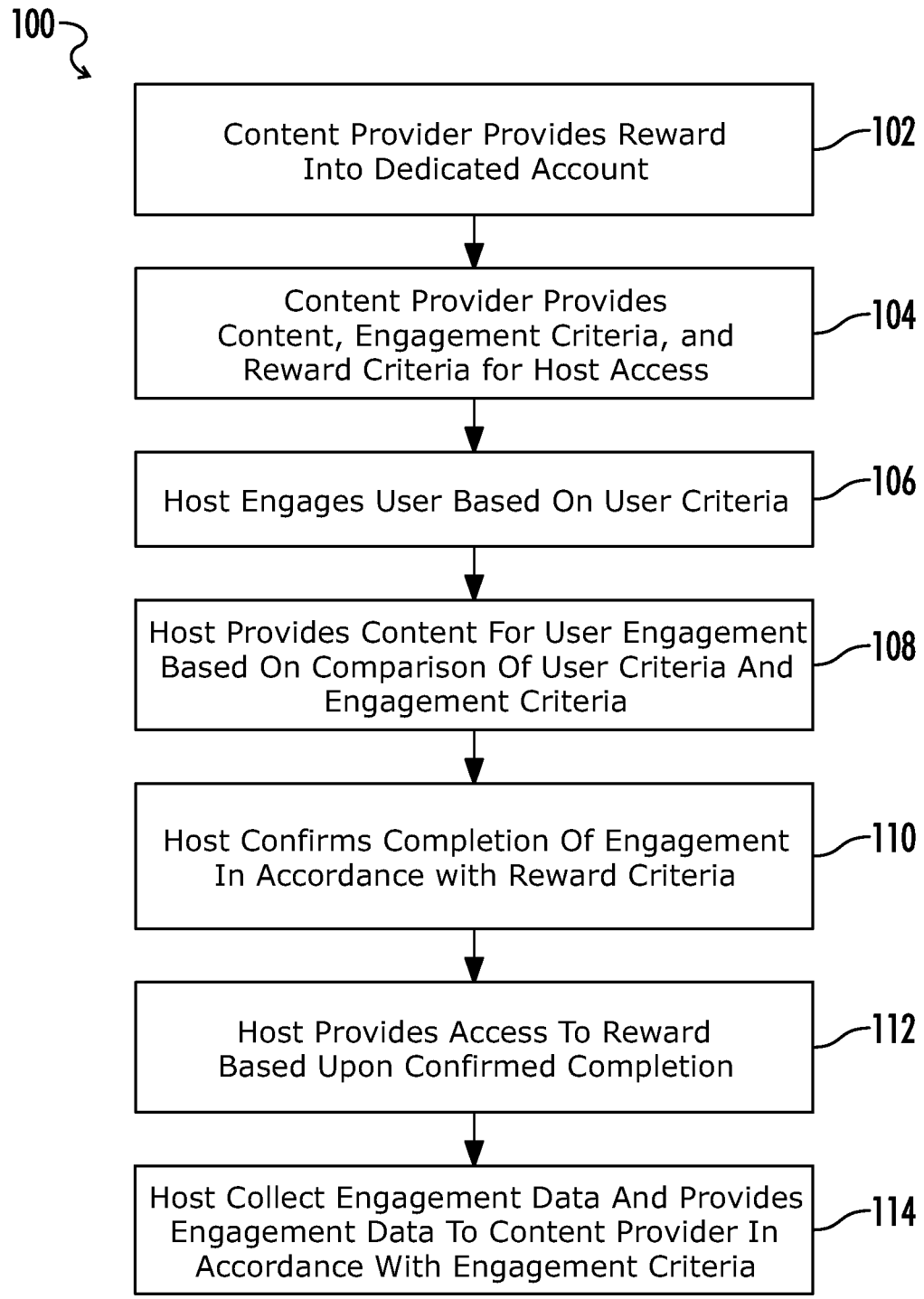
FIG. 3 is a flowchart representing an embodiment of a method in accordance with the present disclosure.
Figure 4:
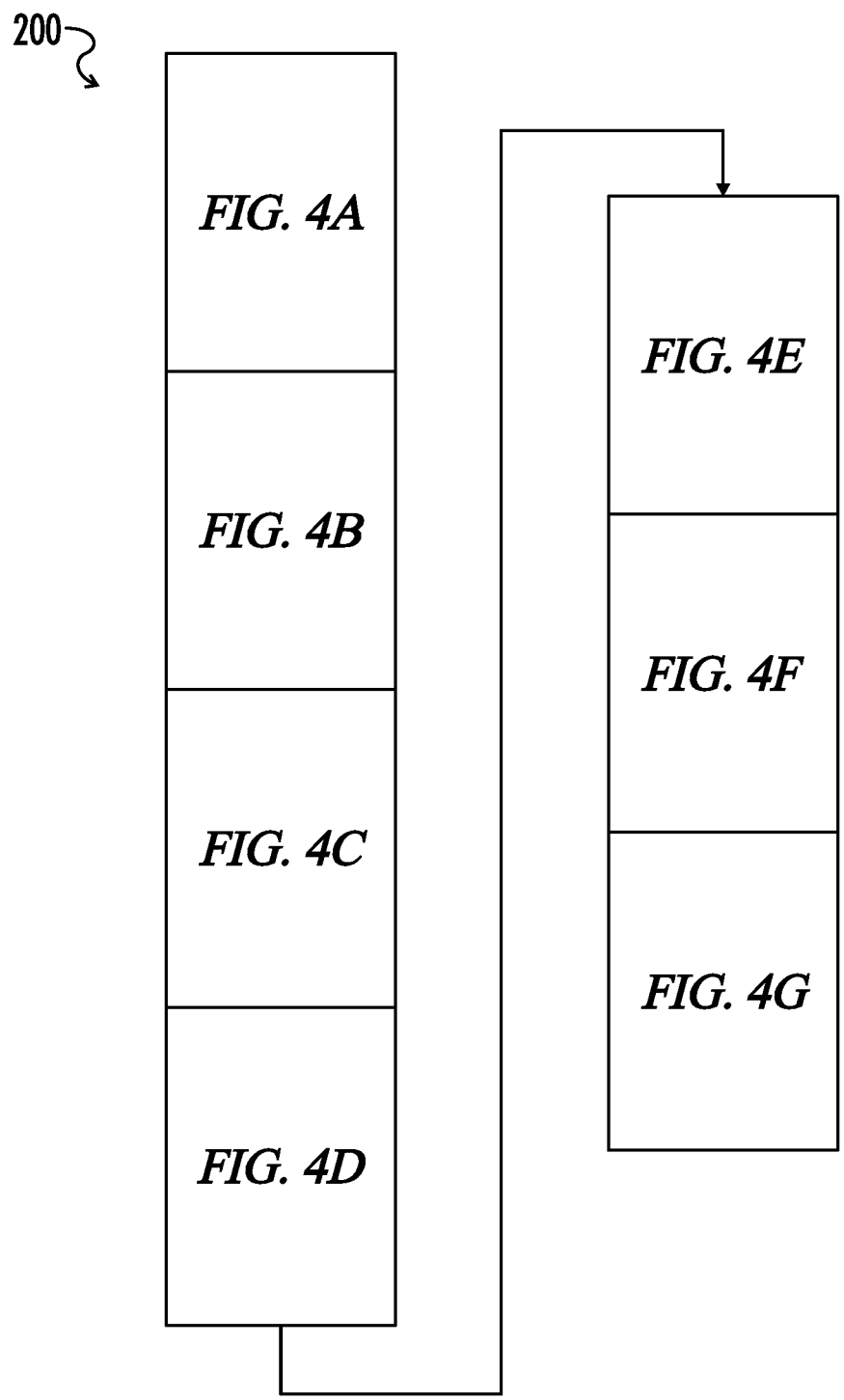
FIG. 4 is a block diagram representing another embodiment of a method in accordance with the present disclosure as detailed in FIGS. 4A to 4G.
Figure 4A:
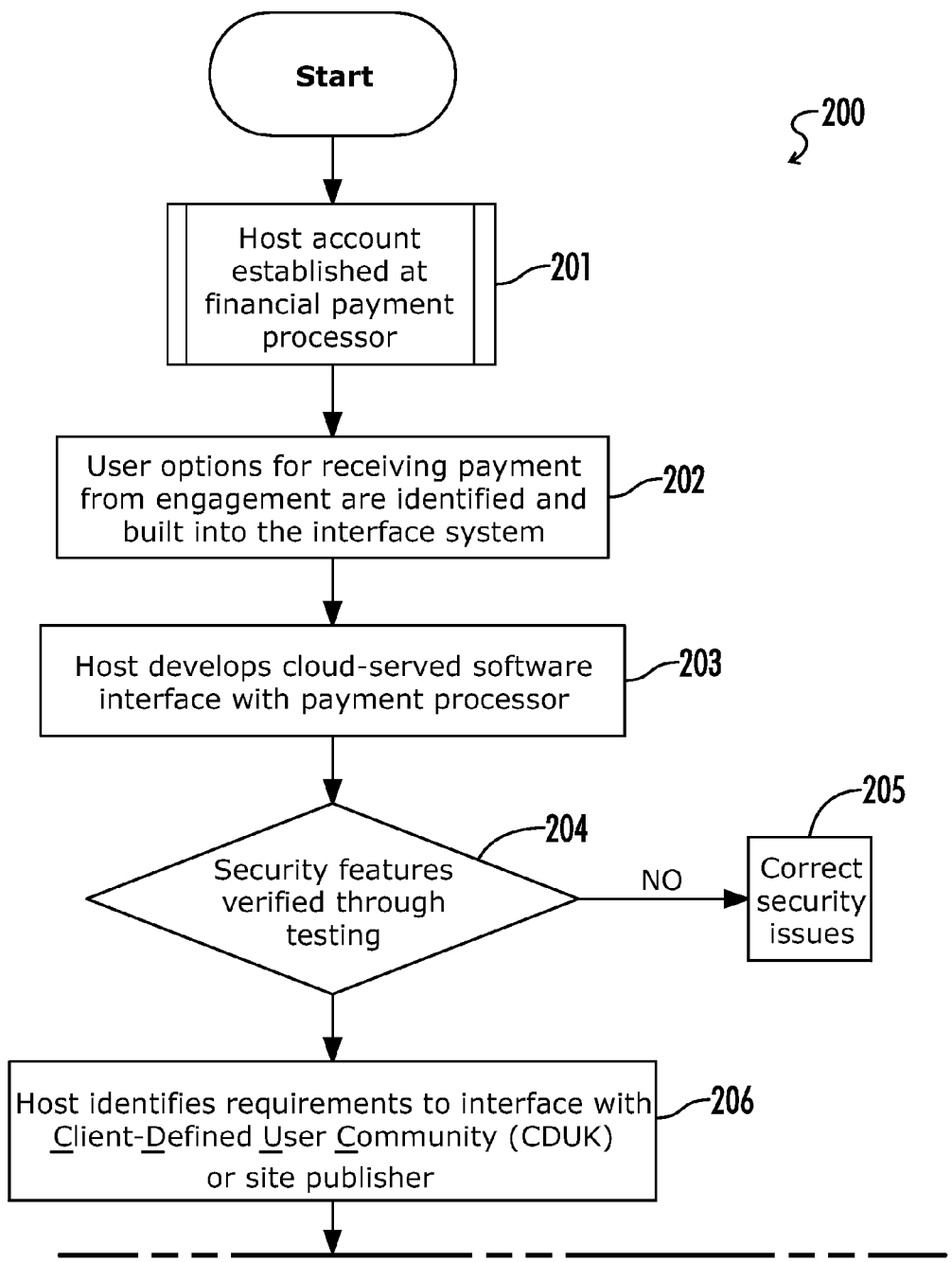
FIG. 4A is a flowchart representing a first set of steps in the method of FIG. 4.
Figure 4B:
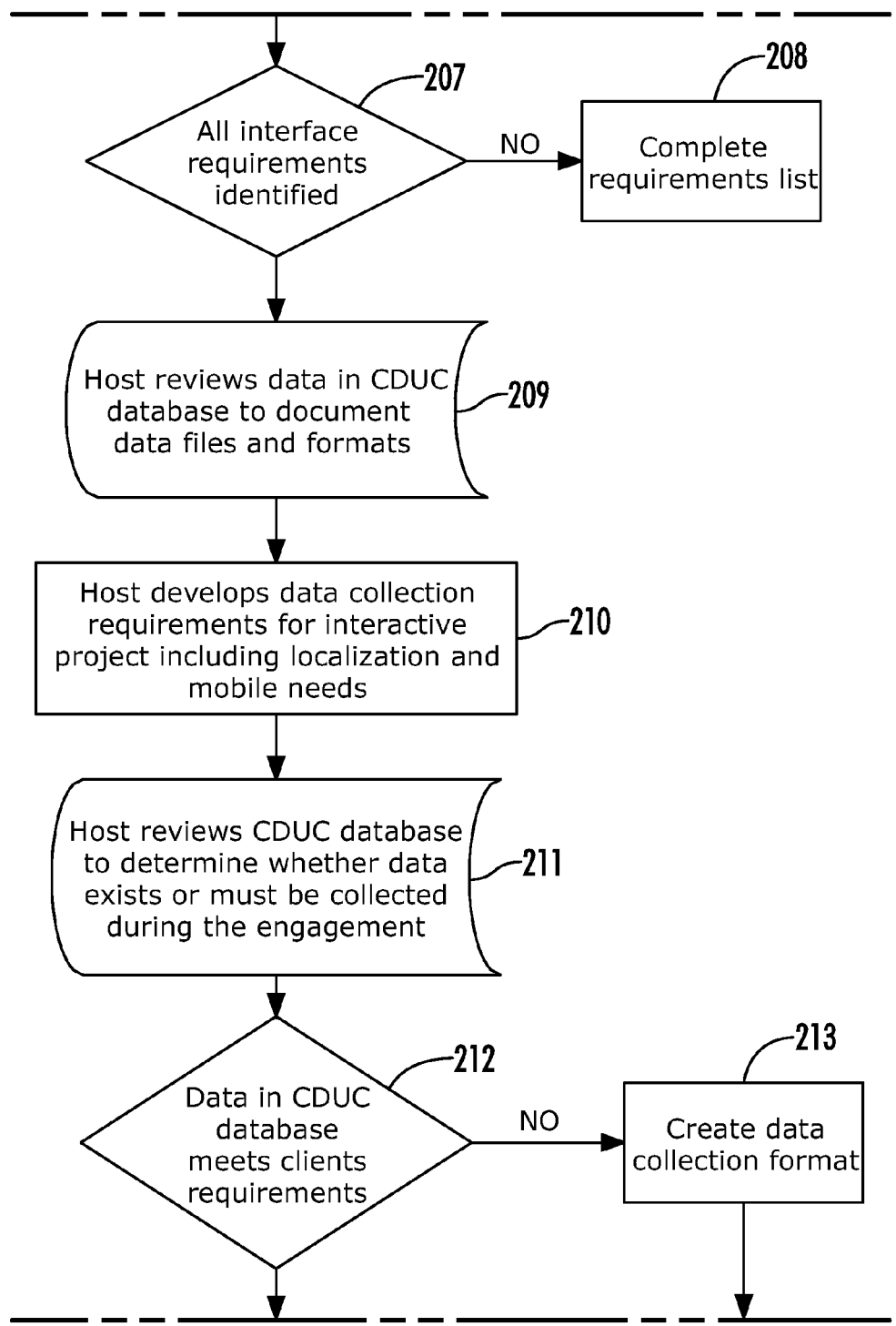
FIG. 4B is a flowchart representing a second set of steps in the method of FIG. 4.
Figure 4C:
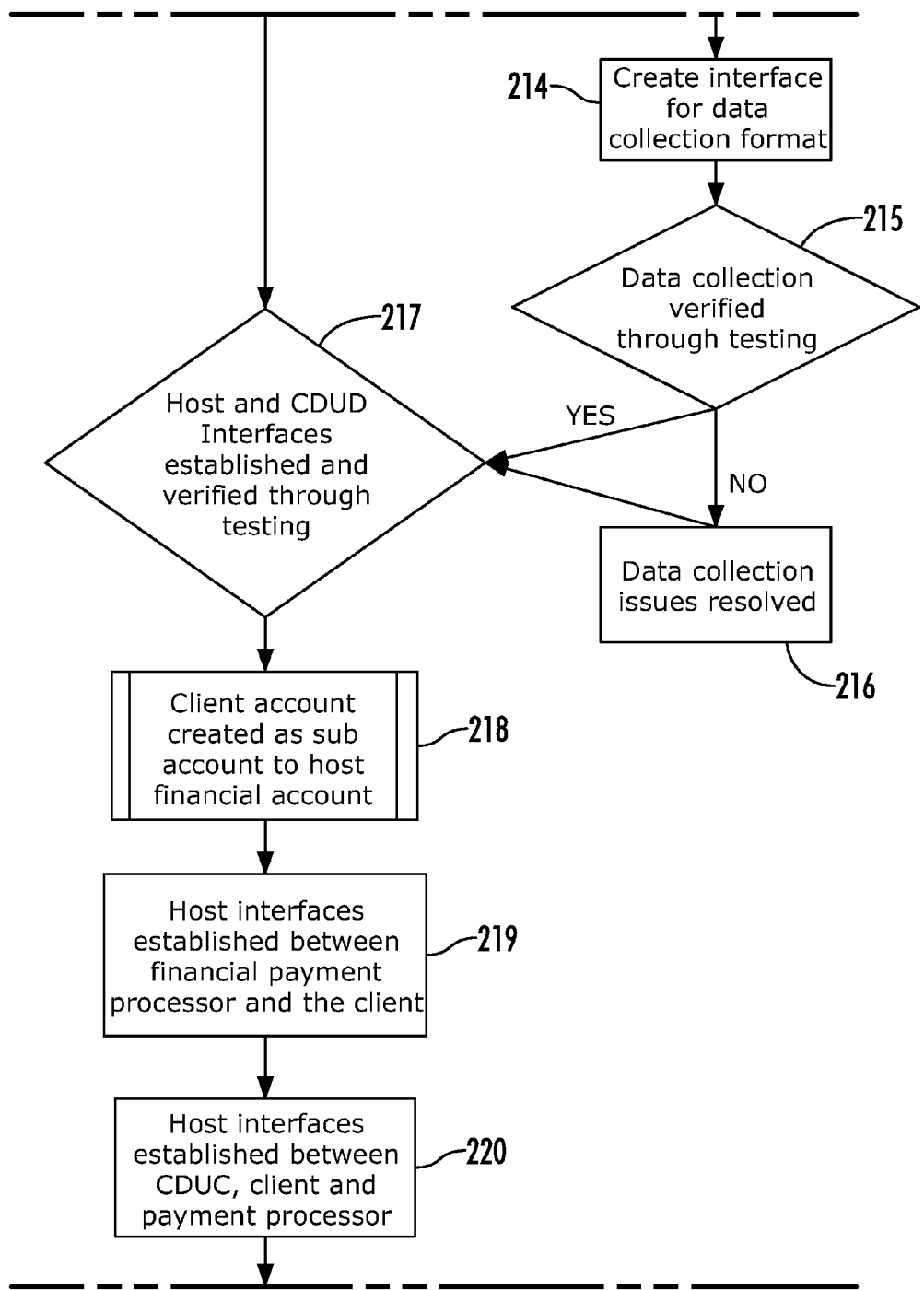
FIG. 4C is a flowchart representing a third set of steps in the method of FIG. 4.
Figure 4D:
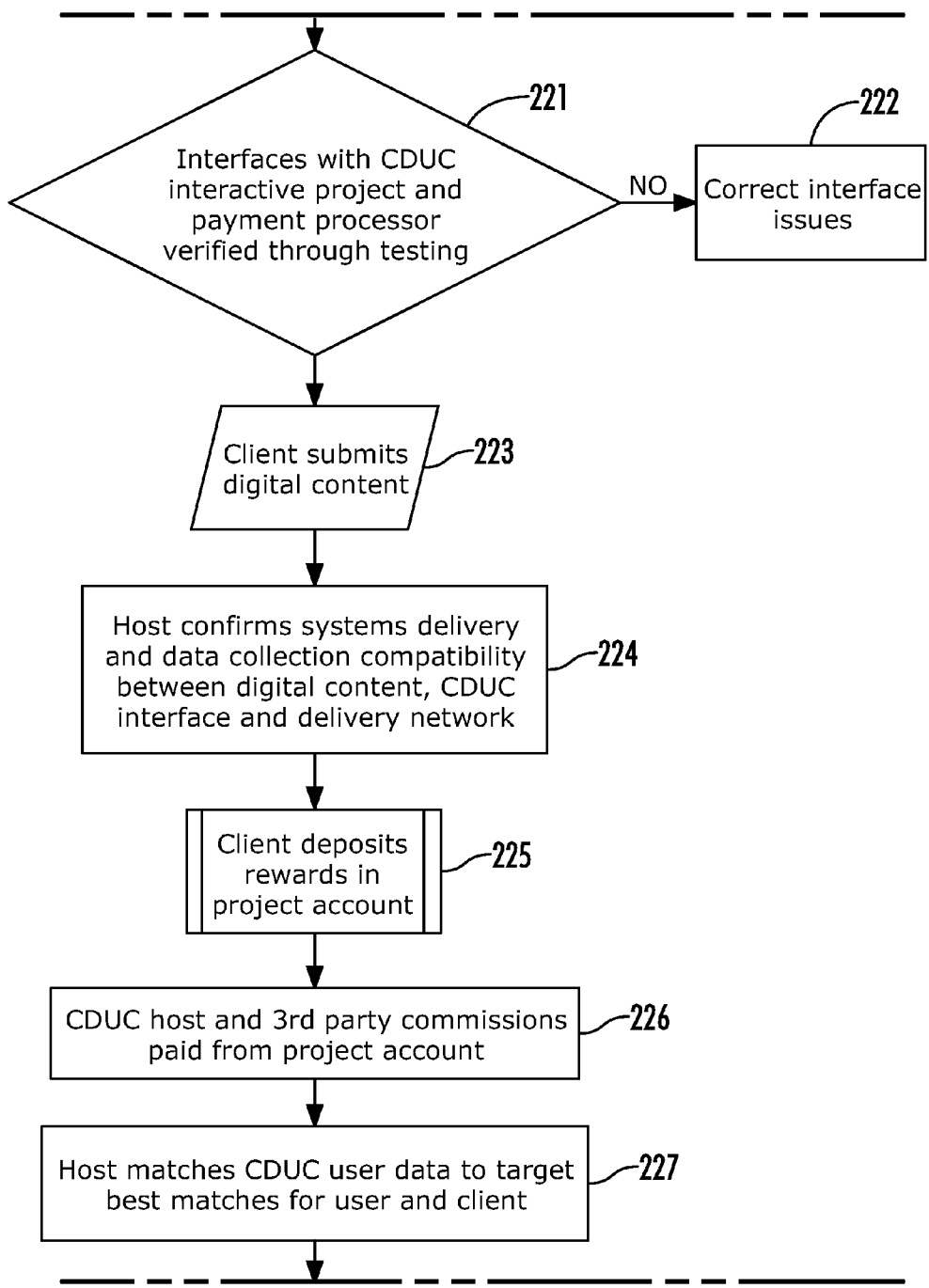
FIG. 4D is a flowchart representing a fourth set of steps in the method of FIG. 4.
Figure 4E:
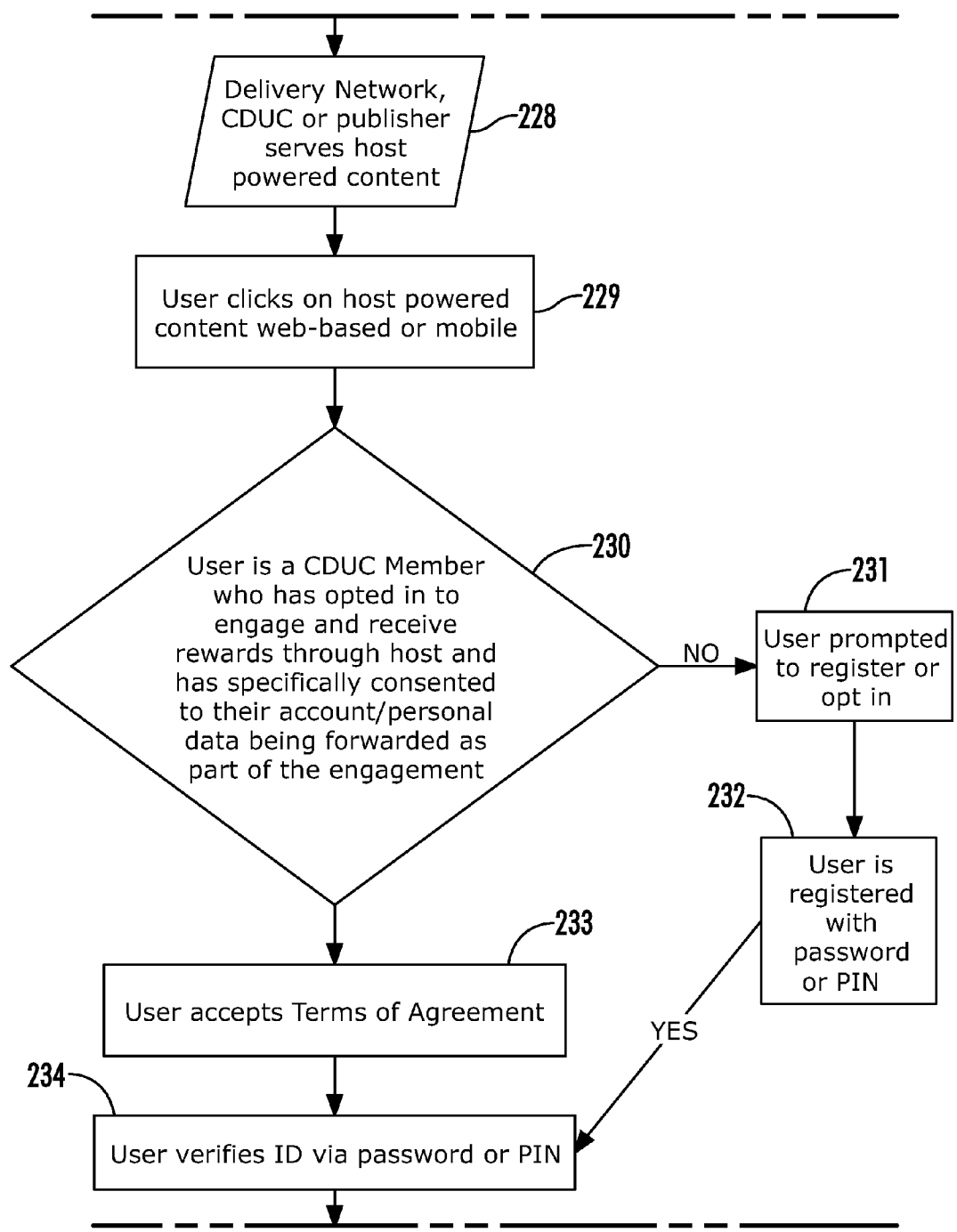
FIG. 4E is a flowchart representing a fifth set of steps in the method of FIG. 4.
Figure 4F:
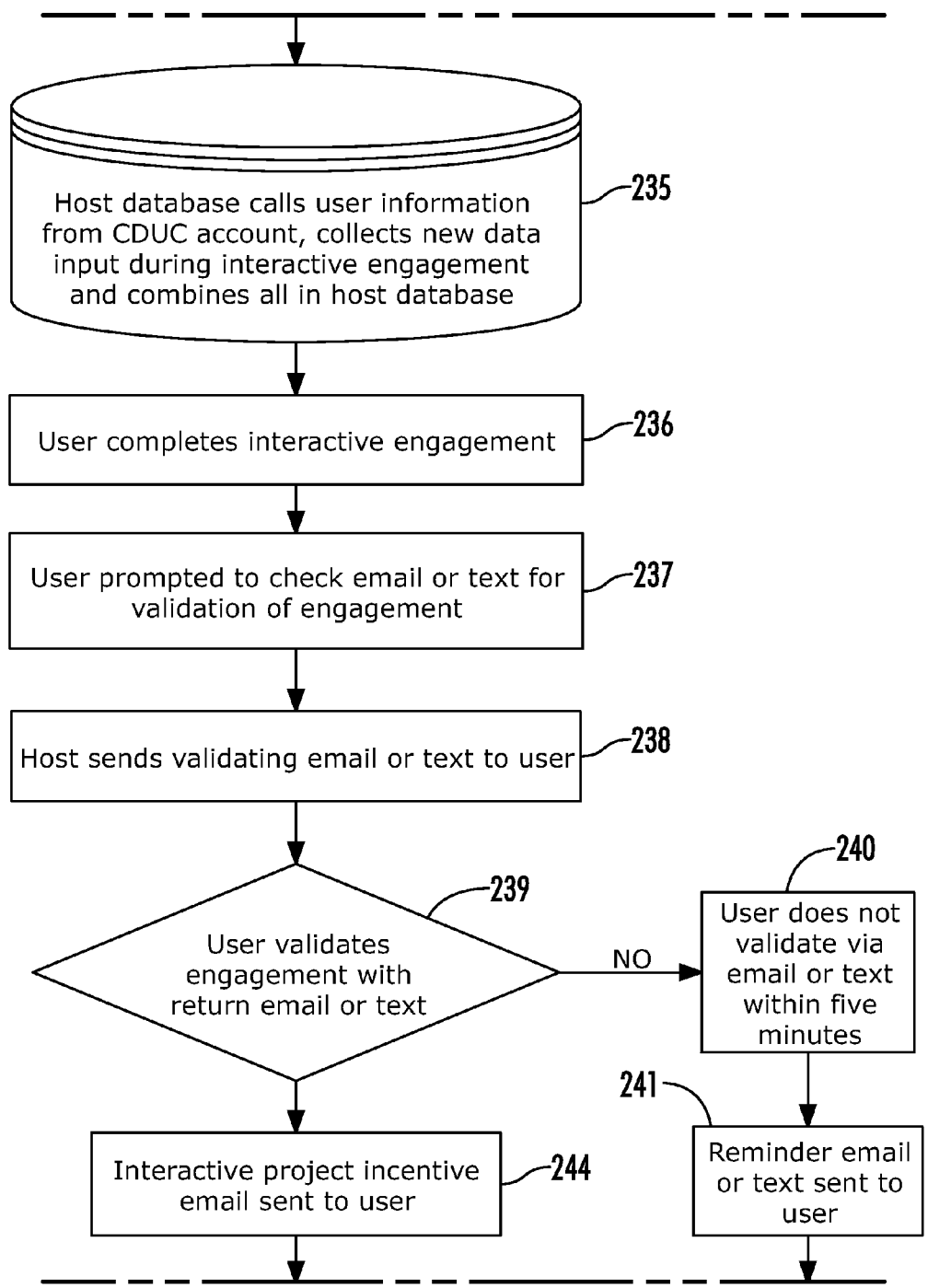
FIG. 4F is a flowchart representing a sixth set of steps in the method of FIG. 4.
Figure 4G:
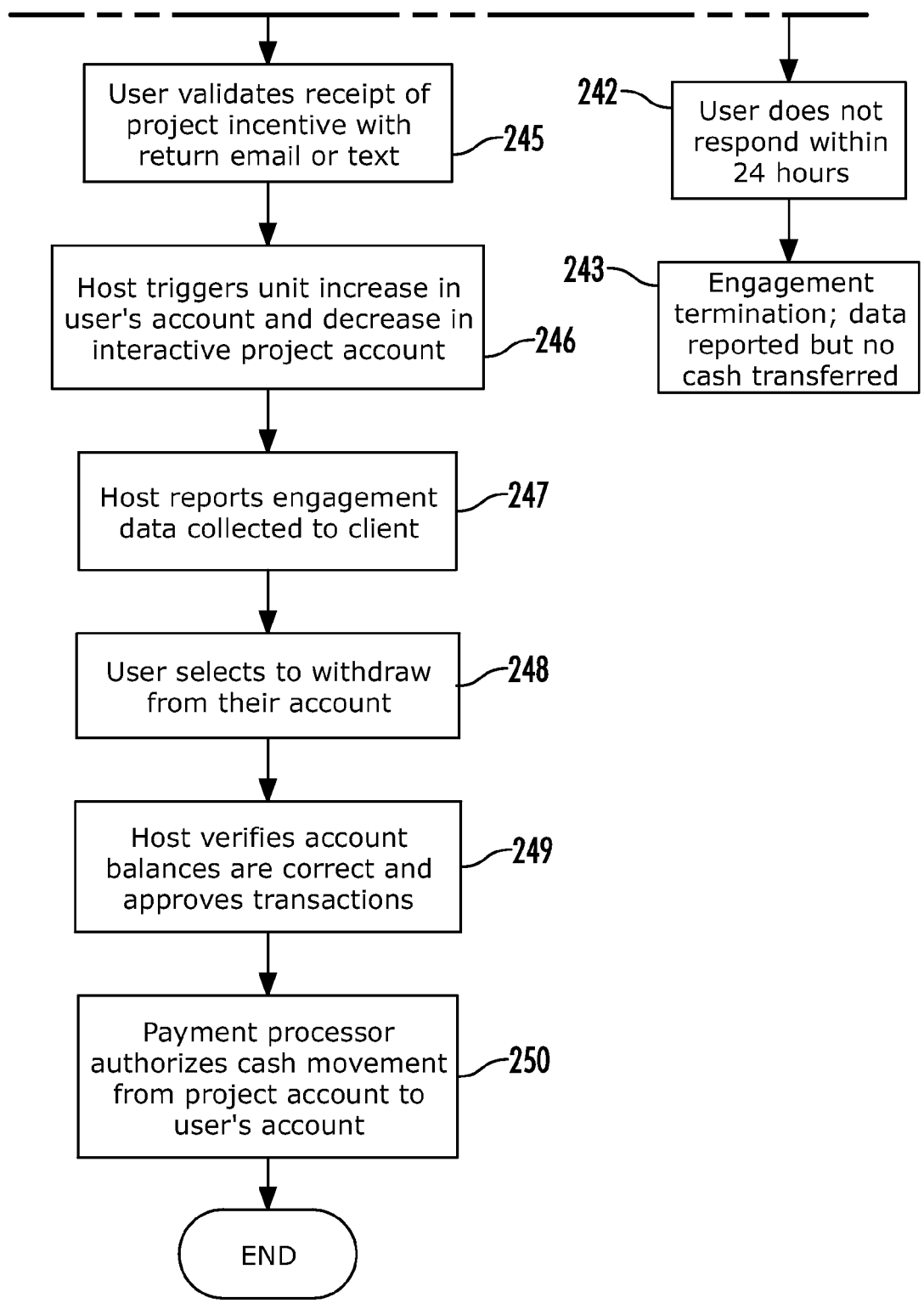
FIG. 4G is a flowchart representing a seventh set of steps in the method of FIG. 4.

Referring to FIG. 3, an exemplary method of operation 100 may begin (in step 102) with a content provider (i.e., client) establishing a reward and providing the reward into a dedicated account. The account may in various embodiments be located in a database on the host server, or may alternatively be established on a remote server separate from either the host or the content provider, on a server associated with the content provider, or even in a database associated with the CDUC where applicable and as referred to above.

"Rewards" as used herein may be incentives of various forms including but not limited to certificates of completion, recognition in other equivalent forms, credits against future activities, or financial instruments or cash payments which may used by the person in a variety of ways, including but not limited to online purchase, ATM withdrawal, pre-paid cards, peer-to-peer transfer, virtual and hard-copy gift certificates, and transference to existing bank or credit card accounts. Where financial rewards are to be provided, the system in such examples can work in conjunction with a financial payment processor or operate independently to track unit movement, on web-based and mobile applications, at the intersections of content presentation and the authorized person's engagement. A reward may generally be predetermined in scope, in that an engagement may be conducted with a user specifying a particular reward to be provided. However, in an embodiment the reward may for example be a financial instrument such as a coupon or stored value card of predetermined value (unitary or monetary) that is applicable with respect to a particular merchant or equivalent source of goods and services or group of the same, as undefined until after completion of the engagement and selection of such source by the user. The financial instrument may for example be provided in association with the digital content engaged and selection of the source of goods and services associated with the financial instrument made based on engagement data collected during the engagement.

In an embodiment, the method requires the content provider to deposit rewards into a reserved account, which is drawn down only when the user completes the desired engagement. The system may include security features that mitigate fraud, including a person opt-in provision for client-defined user communities that will offer the feature as an added benefit, and a person registration process for individual users. In both cases personal data is prompted and collected, including an email address which is individually assigned, a personal identification number and other relevant information which is validated during each engagement.

The host system may then (in step 104) be provided access to digital content, engagement criteria and reward criteria by the content provider. In some embodiments, to be "provided access" may include receiving data via the communications network which includes the associated digital content and criteria, while in other embodiments the content provider may establish a communicative link with the host system such as for example by downloading program modules or snippets which provide the host with access to the content provider system (or portions thereof) via the communications network and as needed to perform the functions of the method.

"Engagement criteria" as used herein may generally refer to any predetermined parameters by which the content provider regulates user access to the content, such as by defining a target demographic, community or alternative group of users, or for example a minimum threshold standard for users to engage (i.e., interact with) the digital content. "Engaging" may be defined generally as accomplishing tasks required by the content provider, which could include such options as reviewing educational materials, watching a video, completing a survey or poll, playing a game, providing an opinion on a new product, drawing others to complete the engagement, and other methods.

"Reward criteria" as used herein may generally refer to any predetermined parameters by which the content provider regulates the minimal requirements that a user must meet to complete the engagement and thereby qualify for the offered reward, including for example an amount of content which is to be engaged, a time period in or by which the content must be engaged, etc.

Once the digital content and associated criteria have been received from or otherwise provided by the content provider, the host engages one or more users based on user criteria (step 106). "User criteria" as used herein may refer generally to any parameters provided by a user with respect to the type or amount of content which they agree to engage, the time limits within which they will agree to engage the content, or the like.

In one example, the host may identify a user group as being associated with or defined by the engagement criteria, and invite one or more users associated with the identified user group to interact with the user interface and obtain access to a predetermined reward. Where for example the user group includes a community database or equivalent information storage with respect to associated users, the host may be able to determine which users (if not all) meet the engagement criteria.

In another example, the host may define a desired user type based on the engagement criteria from the content provider, identify one or more users that are associated with the desired user type, and proactively transmit a message to at least one of the identified users which invites the user to interact with the user interface and obtain access to a predetermined reward. For example, the engagement criteria may state that the content is to engaged only by persons in a particular geographic location, in which case the host may identify potential users in such an area and electronically solicit one or more such potential users in a variety of ways as are known in the art.

In yet another example, the host may publish a general invitation for users to interact with the user interface, with the invitation including for example a description of predetermined rewards to be provided based on successful completion of associated user engagements. An interested user may then submit a request to interact with the user interface, such as for example by clicking on a link provided with the invitation. The request may include user criteria submitted by the user in response to the invitation alone, or alternatively the host may prompt the user for data entry such as for example by a pop-up box wherein the required criteria may be received.

By comparing the user criteria and engagement criteria the host may (in step 108) determine or select digital content that is appropriate for engagement, and then initiate user engagement. In various embodiments this may include making the content available via a user interface generated upon or otherwise associated with a computing device in the user's possession, making the content available via a platform associated with a CDUC as described above, providing access to the content upon a host website generated by the host system, or other equivalent means.

The host then confirms completion of the engagement in accordance with the reward criteria established by the content provider (step 110). For example, where the engagement criteria requires that a particular amount of content be engaged, the host may receive an indication that the entire amount has been engaged, or a portion of the provided digital content in excess of the required amount. Or where the engagement criteria specifies a time period, the host system may be prompted upon lapse of the time period to confirm that the specified digital content has in fact been engaged. Further, the host may in various embodiments be required to confirm that engagement data has been provided by the user in accordance with the engagement, such as where for example the primary motivation for the content provider to provide the rewards is to obtain feedback, or where the digital content is educational materials for which the user must provide responses that meet minimal standards to qualify for a certificate of completion.

In some embodiments, such as where the reward constitutes recognition or certification of completion, the reward in one sense may be predetermined (a certificate) but the scope of the reward may consequently be dependent on for example the amount of digital content engaged by the user in a predetermined period of time. The certificate may recite that a particular user has engaged a certain portion of the provided content, and in some embodiments for example the user may have an account wherein completion of sub-sets of the digital content is noted and aggregated with subsequent engagements until a threshold amount of digital content has been engaged within the scope of the reward criteria. The same idea may apply for financial instruments as well, such as where a predetermined amount of digital content must be engaged, or for a predetermined amount of time, and the user is compelled to postpone or otherwise disengage from the engagement through only a portion of the required time period or amount. In such cases, the host system may be configured to track the user progress and only certify completion upon re-engaging of the user and completion of the remaining requirements. Alternatively, the user may in some embodiments be entitled to reduced portions of the previously agreed-upon reward in a pro-rated sense depending on the amount of content engaged or time spent accordingly.

After finishing the engagement, users may receive an email requiring them to click on a link that completes the transaction, and further, if provided by the content provider, an incentive email or text that contains special offers. The host may provide access to the reward, or otherwise transmit the reward directly to the user or an account in the host system associated with the user (step 112).

The verification processes are designed to ensure for example that an authorized person is provided a reward only once per engagement/project. In some instances, the content provider may want to offer other incentives or for example units of value such as rewards points or some other virtual currency, to retain the person's involvement after the cash unit has been received, and the system may provide content providers the ability to offer such alternative rewards. The particular embodiment described, while describing the transfer of cash rewards from the content provider's account into an authorized user's account, does not prohibit and in fact, provides for the audited system of record that tracks the movement of units, whether cash or other currency, including but not limited to rewards points or other equivalent rewards methods.

The host then collects any engagement data which may have been provided by the user or otherwise gathered before or during the engagement in association with any one or more of the user, the engagement, the time and date, etc., and provides the engagement data to the content provider in accordance with the engagement criteria (step 114). For example, the host may simply post the data in a database on the host system which is accessible, or may transmit the data to the content provider directly, or may be required by the engagement criteria to collect engagement data for a predetermined period of time or from a predetermined number of users before assembling a report of engagement data for the content provider.

Referring next to the flowchart represented in FIGS. 4A to 4G, a further exemplary embodiment of a method 200 for consumer reward engagement may now be described. The description provided herein reflects certain processes that are single in nature, such as set-up and organizing tasks for projects, organizations or campaigns, as well as those that would be repetitive for individual users who utilize the system. While this description may refer to the movement of cash as reward or compensation for users engaging digital content, it may be understood that the system is generally effective to track any unit of measure attributed to a given interactive project, including but not limited to certificates of completion of engagement or of recognition. In addition, not all of the steps in the process are required to be performed for the system to function; steps may be eliminated or the order of the steps modified, in varying circumstances.

The process 200 begins generally in steps 201 to 204 by completing the legal and software requirements necessary for the host system and financial payment processor to accomplish the tasks of establishing accounts; accepting and maintaining funds deposited by clients/content providers; transferring those funds to various users or other parties when authorized and prompted by the host system; and setting up security systems for loss prevention and data misuse.

The host may establish its own account (step 201), which will provide for sub-accounts, the deposits into which can be restricted for use through the project established by the content provider. The host system may serve as an auditable system of record for its own and the sub-accounts.

The host and the financial processor may develop authorized methods for withdrawing funds from the project account and disbursing them into the accounts of various parties (step 202), and the methods for the parties to withdraw the funds from their respective accounts. Such parties may include, but may not be limited to, persons who engage digital content associated with the interactive project established by the content provider; the web or mobile platform, which could include a CDUC or other equivalent platform, on which the project is served; commissions to third parties, the host, and the financial processor. Such methods may include but are not limited to transactions with or except from the content provider, using online purchase, ATM withdrawal, pre-paid cards, peer-to-peer transfer, virtual and hard-copy gift certificates, and transference to existing bank or credit card accounts.

The host may in certain embodiments develop a cloud-served software interface with the payment processor (step 203).

The host and the financial processor may design and develop security features (step 204) for integration of their respective systems to prevent loss through fraud or misuse, and to secure data that currently exists with CDUC's or other parties, as well as data that is collected during and after an engagement with the interactive content, as well as any financial transactions which may be associated with these actions. If such security features are not properly verified through testing (i.e., "no" in response to the query in step 204) the method proceeds to step 205 and the security issues must be corrected before continuing further. If the security features are properly verified (i.e., "yes" in response to the query in step 204) the method proceeds to step 206.

Host system developers may in various embodiments identify and review the requirements necessary for integrating its system with that of a CDUC or other platform (e.g., site publisher) to be implemented within the scope of the present disclosure. The host first identifies the interface requirements with the platform, which for example may own and operate an existing database of user members or associated accounts (step 206). The host may then document the format, substance and types of files contained in the interface platform's existing database. Such types of files could include but may not be limited to, member or user information such as name, address, phone numbers and other personal data, as well as financial information that may be associated with the account. With this documentation the host will be able to ascertain and present to the interface platform or to the content provider what data is currently available to a prospective content provider for a given interactive project. The host may further (in step 207) identify the format requirements, specific data to be collected, the collection methods, reporting channels and other aspects needed during the project to meet the needs of the client/content provider. The process may enable a number of commonly-required fields and formats, and further allow for customization by the content provider, as needed or required.

If all interface requirements are not identified (i.e., "no" in response to the query in step 207), the method may be prompted to proceed to step 208 and the requirements list completed. If all interface requirements are identified (i.e., "yes" in response to the query in step 208), the host then reviews data in the CDUC database to document data files and formats (step 209), and develops data collection requirements for the interactive project, including localization and mobile needs where applicable (step 210).

The host may then review the CDUC database (step 211) to determine (in step 212) whether data required by the content provider as part of the predetermined engagement criteria or reward criteria already exists, or must alternatively be collected from the users during the engagement. Should additional data collection be necessary (i.e., "no" in response to the query in step 212), the host system may be prompted to complete the requirements list by for example identifying and developing the specific data to be collected, the formats and methods of collection and reporting channels (step 213), and creating an interface for data collection formats (step 214). The data collection and management in this part of the process may be verified (in step 215) by testing the system to ensure the process accommodates the needs of the interface platform, the content provider, the host system and the financial processor. If the data collection methods are not verified (i.e., "no" in response to the query in step 215) the host may be prompted to resolve the data collection issues before proceeding further. Otherwise, the method proceeds to step 217, and the host and CDUC interfaces may be established and verified through testing. With the host system's successful interface with the financial processor, the CDUC platform and the content provider, the next phase will include integration of the data management needs of all four parties.

In various embodiments, particularly but not entirely limited to an example where monetary funds are intended as the user reward, the content provider may (in step 218) establish a sub-account of the host's existing account with the financial processor. Into this account, the content provider will deposit funds, disbursements from which upon successful engagement with the interactive project will be transferred to the relevant parties as previously described.

Host system interfaces may then be established between the financial payment processor and the client/content provider (step 219), and further host system interfaces established between the CDUC, content provider, and the financial payment processor (step 220). The host will test the interfaces (step 221) to ensure data collection is secure, formats are compatible, reporting mechanisms are in place, and resolve issues related to same (in step 222, i.e., where "no" is the response to the query in step 221), before continuing.

In the next phase of the method 100, the content provider, whether the content owner or the host itself, submits the digital content to be served (and engaged) in a host system-powered project space on the platform (step 223). The host tests and verifies that the interfaces with the digital content and the CDUC platform's database and the host system's database are working properly (step 224). In other words, the host confirms the digital content delivery network from the host database to the CDUC platform database and associated user interface. The content provider then deposits funds into the account at the payment processor system, restricted for access by or otherwise the use in accordance with the particular project (step 225). Parties as described above (e.g., the host, CDUC, third parties entitled to commissions, payment processor) receive payments as previously agreed (step 226).

The host and the delivery platform may in various embodiments next identify which members or users of the platform would be most receptive to engaging in the campaign, based on the parameters (engagement criteria) provided by the content provider (step 227). The host may obtain access to user data residing in the CDUC database and generate a list of users that may be permitted to participate if such users elect to obtain the predetermined reward, or may alternatively generate a list of users that may be required to participate, most particularly where for example the users are associated directly with the content provider itself. In other embodiments the CDUC may obtain the engagement criteria, generate a list of users, and provide the list to the host. In even further embodiments, where for example the delivery platform is associated with the host or otherwise by an entity not controlled by or within the scope of the CDUC, the host may generate or otherwise obtain a list of CDUC members or users that are appropriate based on the engagement criteria, and then contact the users directly to invite participation or publish such invitations on for example a CDUC-related message board or any other equivalent publication means that may reach the desired users. The digital content is then served (by the delivery network, CDUC platform, site publisher, etc.) into a space on the platform that is powered by the host system (step 228).

One or more persons (whether CDUC members, users, visitors, related parties, etc.) may therefore receive notice or otherwise become aware of the host system-powered interactive project, and subsequently initiate engagement of the digital content by for example clicking on an associated link via web-based or mobile application as supported by the interface platform (step 229). The host system may vet the user (in step 230) engaging with the digital content and begin the transaction auditing process, by determining that the person is a member of the platform, with an existing profile, who has opted-in to the terms of agreement as specified in the engagement (including consent to distribute collected information). The host system may then take action, if these details cannot be verified (i.e., "no" in response to the query in step 230), to prompt the person to register as a member/user of the platform, or to opt in for use of the system if she/he is a registered member and has not previously opted in (steps 231, 232). Where the user has accepted the terms of agreement (step 233, i.e., "yes" in response to the query of step 230), or after registration of the user in step 232, the host system follows up by verifying, by password or personal identification number (PIN), that the person engaging is actually the person who is registered and accepted the terms of agreement (step 234). The host may then collect, track and report engagement data based on the engagement requirements previously identified above, and further collate and process data from the platform and the collected engagement data into the host system's database (step 235).

The user interacting with the digital content may provide notice of having completed the engagement (step 236), or the host system may detect completion of the engagement by tracking the user's actions and/or where for example a predetermined amount of time has elapsed or a predetermined amount or block of digital content has been engaged within the scope of the engagement criteria or otherwise an agreement established with the user in accordance with predetermined user criteria.

The user may be requested or required to perform a series of tasks for security and auditing purposes, concluding with the host system's approval to generate or provide the predetermined reward for engagement completion. The user may for example upon completing the engagement, signify such by providing any information required by the content provider; clicking the requisite acceptances; and acknowledging that she/he will need to verify the interaction before being rewarded for the transaction, particularly where cash rewards are at issue. The host may prompt the user (in step 237) to verify the transaction with an appropriate response to an email or text (depending on whether the person is using a web or mobile base) which is sent to the user (in step 238). Through a series of instructions, the user is required to accept and respond to the email or text sent by the host system. If the user does not respond to the verification email or text to validate the transaction within a prescribed period, as noted in the terms of agreement and in the prompts (step 240, i.e., "no" in response to the query of step 239), the system will send a reminder email or text (step 241). If the user has not verified the transaction by responding to the email or text within another predetermined period of time (step 242), the host system may then (in step 243) terminate the engagement, notify the user by email or text that the transaction was not approved, report the data collected to the content provider, signify that the engagement was incomplete and not authorize a reward disbursement, unit increase to the user balance or any actual transfer of funds.

If the user completes the verifications as required (i.e., "yes" in response to the query of step 239), the host system accepts and confirms the transaction is valid, and a content provider's incentive email or text is sent to the user (step 244). If/when the user accepts and confirms receipt of the incentive (step 245) with for example a return email or text as applicable, the host system approves the reward disbursement (step 246) such as for example an increase of unit value in the user's account, and a commensurate decrease in the content provider's account. Where for example certificates of completion are established as the appropriate reward, there may be a predetermined number of such certificates in which case the increment/decrement process is appropriate, or the decrementing step from the content provider may be redundant where for example a mere notation of certificates distributed is sufficient. Where funds or financial instruments are the appropriate reward, no actual transfer occurs at this time, unless the user requests a withdrawal from her/his account. In this case, funds are transferred to the user's account, along with any associated fees to the relevant parties. Depending on agreements between the parties, a transaction fee may be assessed and disbursed from the content provider's account to approved parties.

The host system then collates, verifies, standardizes and reports the data existing in the platform and the engagement data collected during the interactive project, to the content provider (step 247). The host system enables the data to be segmented for use by the content provider and other authorized parties, which may include the CDUC (delivery) platform, the host and certain third parties.

In embodiments where funds are the appropriate reward, the next phase of the method may include actions that provide for the actual transfer of funds from the content provider's account into the approved user's account, which can be withdrawn by that user as per user criteria or other predetermined elections. When the host system approves an increase of unit value to the user's account via a decrease in unit value from the content provider's account, as previously described above, the user may be authorized to request a withdrawal of the funds (step 248). Upon such authorized request for withdrawal, the host system verifies the account balances and approves the movement of funds by the financial processor from the content provider's account and into the user's account (step 249), final authorization of which comes from the payment processor (step 250). When the transaction occurs, certain fees may be paid to other parties, based on pre-approved agreements. When the financial processor completes the transactions in this section, the system notes the audit trail of the engagement from beginning to end, and posts the engagement complete.

The previous detailed description has been provided for the purposes of illustration and description. Thus, although there have been described particular embodiments of the present invention of a new and useful "Host System and Method of Facilitating Consumer Engagement of Digital Content from Third-Party Providers," it is not intended that such references be construed as limitations upon the scope of this invention except as set forth in the following claims.

What is claimed is:

1. A method implemented by a host computer system, the method comprising:
   acquiring access to a set of digital content, associated user engagement criteria and reward criteria provided by a content provider, the engagement criteria identifying a user community platform having a plurality of member users and further defining target user parameters for the digital content, the reward criteria defining a required level of engagement to qualify for a reward;
   establishing a user interface and a content delivery network in association with the user community platform;
   accessing a member user database associated with the user community platform, the member user database comprising user information corresponding to one or more of the target user parameters;
   determining one or more target users for engagement of at least one item of the set of digital content based on the target user parameters and the user information;
   engaging a target user to interact with the user interface and enabling the user to provide personalized user criteria for engaging one or more of the digital content;
   delivering selected digital content to the user via the user interface, the content selected from the set of digital content based on the user criteria and the user engagement criteria;
   confirming completion of the user engagement in accordance with the reward criteria;
   providing access by the user to a predetermined reward based upon confirmed completion of the engagement; and
   collecting user engagement data in accordance with the engagement criteria and providing the content provider with access to the user engagement data.

2. The method of claim 1, the host computer system residing on at least a first server, the step of acquiring access to digital content, user engagement criteria and reward criteria provided by a content provider further comprising
   functionally linking the first server to a remote server upon which is stored digital content, user engagement criteria and reward criteria provided by a content provider.

3. The method of claim 1, the step of determining one or more target users for engagement comprising submitting the engagement criteria to the user community platform, requesting a list of appropriate users based on the engagement criteria and associated contact information from the user community platform, and submitting engagement invitations to one or more appropriate users as provided by the user community platform.

4. The method of claim 1, the host computer system residing on at least a first server, the step of acquiring access to digital content, user engagement criteria and reward criteria provided by a content provider further comprising establishing an account associated with the content provider in a database residing on the first server, receiving at the first server digital content, user engagement criteria and reward criteria provided by a content provider via the communications network, and storing the digital content, user engagement criteria and reward criteria in the content provider account.

5. The method of claim 1, the step of engaging a user to interact with the host system based on user criteria further comprising publishing a general invitation for users to interact with the user interface, the general invitation comprising a description of predetermined rewards to be provided based on successful completion of associated user engagements, and receiving a request from a user to interact with the user interface, the request further comprising user criteria submitted by the user.

6. The method of claim 1, the reward criteria further defining a scope of the reward corresponding to an amount of content engagement by a user within a predetermined period of time.

7. The method of claim 1, further comprising:

tracking an amount of user engagement with the digital content during a current engagement period; and aggregating the amount of user engagement during the current engagement period and amounts of user engagement during previous engagements of the digital content, wherein the step of confirming completion of the user engagement comprises comparing an aggregated amount of user engagement with the required level of engagement to qualify for the reward.

8. The method of claim 1, the user community platform comprising a social network.

9. The method of claim 1, the user community platform comprising an e-commerce shopping site.

\* \* \* \* \*